United States Patent
Ooshita

(10) Patent No.: US 6,815,979 B2
(45) Date of Patent: Nov. 9, 2004

(54) IMPEDANCE CONTROL CIRCUIT FOR CONTROLLING MULTIPLE DIFFERENT IMPEDANCES WITH SINGLE CONTROL CIRCUIT

(75) Inventor: Takeshi Ooshita, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 10/323,834

(22) Filed: Dec. 20, 2002

(65) Prior Publication Data

US 2004/0000926 A1 Jan. 1, 2004

(30) Foreign Application Priority Data

Jul. 1, 2002 (JP) ......................................... 2002-192523

(51) Int. Cl.[7] .................. H03K 19/0175; H03K 19/003
(52) U.S. Cl. .............................. 326/30; 326/82; 326/83; 326/86; 326/87; 326/90; 326/91
(58) Field of Search ............................... 326/30, 82–83, 326/86–87, 90–91; 327/541

(56) References Cited

U.S. PATENT DOCUMENTS

| 5,134,311 | A | * | 7/1992 | Biber et al. .................. 327/108 |
| 6,087,847 | A | * | 7/2000 | Mooney et al. ................ 326/30 |
| 6,094,069 | A | | 7/2000 | Magane et al. |
| 6,157,206 | A | * | 12/2000 | Taylor et al. .................. 326/30 |
| 6,445,170 | B1 | * | 9/2002 | Pangal et al. ................ 323/315 |
| 6,445,245 | B1 | * | 9/2002 | Schultz et al. .............. 327/541 |
| 6,448,811 | B1 | * | 9/2002 | Narendra et al. ............. 326/82 |
| 6,489,837 | B2 | * | 12/2002 | Schultz et al. .............. 327/541 |

* cited by examiner

Primary Examiner—Michael Tokar
Assistant Examiner—Khai M. Nguyen
(74) Attorney, Agent, or Firm—Burns, Doane, Swecker & Mathis, L.L.P.

(57) ABSTRACT

An impedance control circuit includes a reference voltage output circuit for outputting one of a plurality of reference voltages; a variable resistor; a comparator and a control circuit. The comparator includes a first input terminal supplied with a reference voltage from the reference voltage output circuit and a second input terminal connected to the variable resistor, and compares the voltages at the first and second input terminals. The control circuit controls the variable resistor and establishes a plurality of impedances corresponding to the reference voltages in response to the signal output from the comparator. It enables the single impedance control circuit to control the plurality of different impedances on the semiconductor integrated circuit.

8 Claims, 11 Drawing Sheets

IMPEDANCE CONTROL CIRCUIT FOR CONTROLLING MULTIPLE DIFFERENT IMPEDANCES WITH SINGLE CONTROL CIRCUIT

BACKGROUND OF THE INVENTION

1. Field of the Invention

The present invention relates to an impedance circuit for controlling the impedance of an I/O circuit on a semiconductor integrated circuit.

2. Description of Related Art

It becomes absolutely necessary for high-speed digital circuits to perform high rate, small amplitude signal transmission. To achieve the high rate signal transmission, the impedance of a transmission line must be matched to that of a transmitting/receiving circuit to reduce reflection and to prevent superfluous noise.

Furthermore, the transmission becomes increasingly difficult because of growing variations in transmission characteristics in signal sequences. To compensate for such a situation, dynamically variable impedance is used for the I/O circuit to maintain the transmission characteristics at desirable conditions.

Thus, various I/O specifications have made their current/voltage standards more rigorous to assure high rate transmission.

For this reason, a circuit for controlling the impedance or current/voltage characteristics becomes essential. Furthermore, it becomes increasingly necessary for a single semiconductor integrated circuit to include a circuit with variable impedance or current/voltage characteristics, or to switch the impedance or current/voltage characteristics statically or dynamically.

FIG. 15 is a block diagram showing a configuration of a conventional impedance control circuit disclosed in Japanese patent application laid-open No. 11-234110/1999, for example. In FIG. 15, the reference numeral 1 designates an LSI, 2 designates an impedance control circuit, and 3 designates a control circuit. The reference numeral 5 designates an analog comparator, and 6 designates a variable channel width MOS transistor (called "variable width MOS" from now on). Although it is represented as a single MOS transistor in FIG. 15, it actually consists of a plurality of MOS transistors connected in parallel, each of which is controlled into conduction or out of conduction. Thus, the total channel width is determined as the sum of the channel widths of all the conducting MOS transistors, making the channel width variable. In the counter 3, the reference numeral 7 designates a counter, and 8 designates a register. The reference numerals 9 each designate an output circuit, and 10 and 11 each designate a connecting terminal (called "PAD" from now on). The reference numeral 12 designates a reference resistor (called "$R_{ref}$" from now on), 13 designates a reference voltage (called "Cal_Vref" from now on), and 20 designates a power supply voltage (called "$V_{dd}$" from now on).

Next, the operation of the conventional impedance control circuit will be described.

The conventional impedance control circuit controls the resistance of the variable width MOS 6 such that the Cal_Vref 13 becomes equal to the voltage determined by the ratio between the $R_{ref}$ 12 and the resistance of the variable width MOS 6 as shown in FIG. 15.

The control circuit 3 includes the counter 7 for varying a number $N_{code}$ in sequence at fixed intervals so that the number $N_{code}$ satisfies the following relationship.

$$W_{eff}=W_u \times N_{code}$$

where $W_{eff}$ is the effective width of the variable width MOS 6, $W_u$ is a unit of the channel width variation, and the number $N_{code}$ designates the number of MOS transistors to be turned on and off.

FIG. 16 is a graph illustrating the operating principle of the conventional impedance control circuit. The potential at the PAD 10, the connecting point of the variable width MOS 6 with the $R_{ref}$ 12, varies with the number $N_{code}$. The output of the analog comparator 5 makes a transition at the point where the potential passes across the reference voltage Cal_Vref 13.

FIG. 17 is a diagram illustrating an operating timing of the conventional impedance control circuit. The control circuit 3 monitors the output of the analog comparator 5. When the output of the analog comparator 5 makes a transition, that is, when the divided voltage by the $R_{ref}$ 12 and the variable width MOS 6 becomes Cal_Vref 13, the control circuit 3 stores the number $N_{code}$ at that time in the register 8. Thus, all the output circuits 9 takes the same resistance when the number $N_{code}$ stored in the register 8 is supplied.

With this configuration, the resistance of all the output circuits 9 of the semiconductor integrated circuit (LSI) 1 is controlled as follows.

$$R_m/(R_{ref}+R_m)=\text{Cal\_Vref}/V_{dd} \quad (1)$$

$$R_m=R_{ref} \times \text{Cal\_Vref}/(V_{dd}-\text{Cal\_Vref}) \quad (2)$$

where $R_m$ is the resistance of the variable width MOS 6. In the present specification, a symbol representing a voltage is also used as the value of the voltage whose unit is Volt, and a symbol representing a resistor is also used as the value of the resistor whose unit is Ω.

As described above, the conventional impedance control circuit can equalize the impedance of all the output circuits 9 on the semiconductor integrated circuit. However, it has the following restrictions.

(1) It equalizes the impedance using the single reference voltage.

(2) It sets the Cal_Vref 13 at $V_{dd}/2$ when the resistance $R_m$ of the variable width MOS 6 is equal to the $R_{ref}$ 12.

With the foregoing configuration, the conventional impedance control circuit has the following problems.

(1) To control the impedances to different values in the same chip, it must mount the control circuits by the number of the impedances to be controlled.

(2) It must connect considerable number of reference resistors outside the chip. In addition, it can only adjust the impedances to the values corresponding to the reference resistors connected.

(3) It cannot isolate a parasitic resistance from the resistance of the variable width MOS 6 itself.

SUMMARY OF THE INVENTION

The present invention is implemented to solve the foregoing problems. It is therefore an object of the present invention to provide an impedance control circuit enabling a single control circuit to control a plurality of different impedances in the same semiconductor integrated circuit.

Another object of the present invention is to provide an impedance control circuit capable of reducing the number of reference resistors to be connected externally.

Another object of the present invention is to provide an impedance control circuit capable of carrying out optimum control by measuring the total resistance of the variable width MOS plus the additional resistance at a plurality of bias points, and by isolating the contribution of the additional resistance (parasitic resistance or serial resistance) from that of the variable width MOS.

Another object of the present invention is to provide an impedance control circuit that can adjust to any desired values by carrying out calculation using the measured results of the impedance.

Still another object of the present invention is to provide an impedance control circuit with a reduced number of pins by integrating the reference voltage.

According to one aspect of the present invention, there is provided an impedance control circuit including a comparator for comparing one of a plurality of reference voltages with a voltage across a variable resistor, and a control circuit for establishing a plurality of different impedances corresponding to the plurality of reference voltages in response to a signal output from the comparator. It offers an advantage of being able to control the plurality of impedances on the semiconductor integrated circuit using only one control circuit.

DETAILED DESCRIPTION OF THE PREFERRED EMBODIMENTS

The invention will now be described with reference to the accompanying drawings.

Embodiment 1

Figure 1:
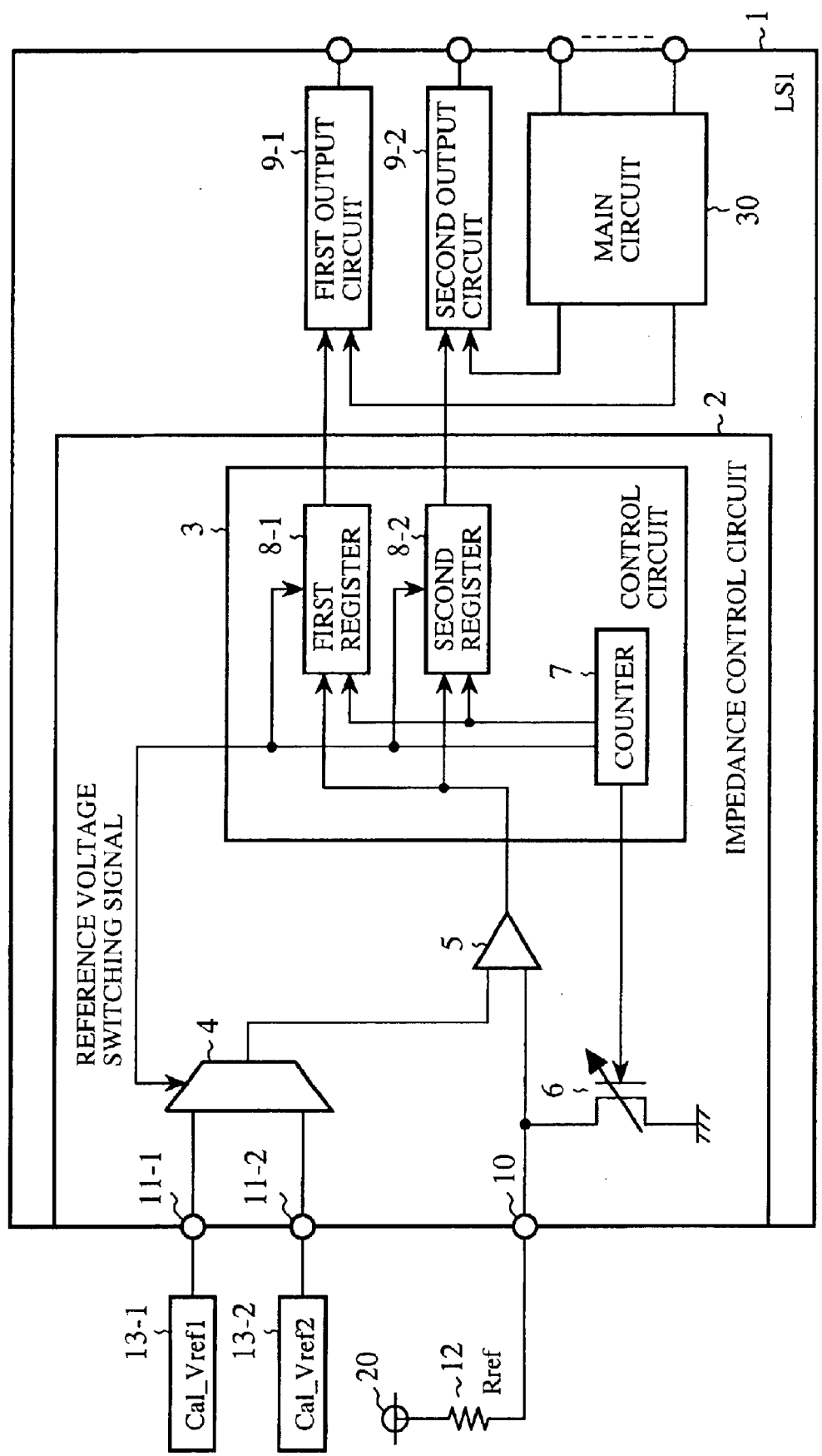
FIG. 1 is a block diagram showing a configuration of an embodiment 1 of the impedance control circuit in accordance with the present invention.
Figure 15:
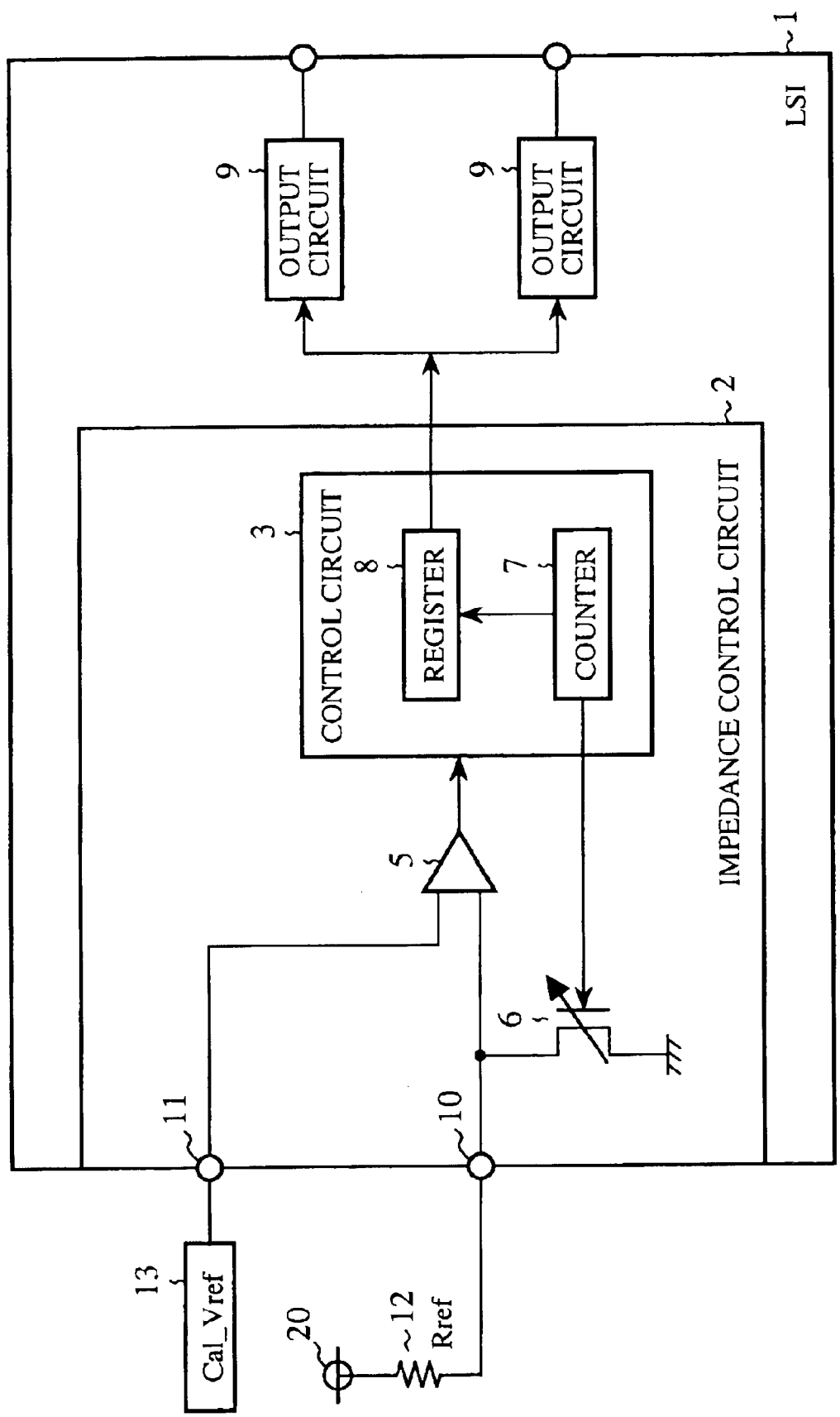
FIG. 15 is a block diagram showing a configuration of a conventional impedance control circuit.
Figure 16:
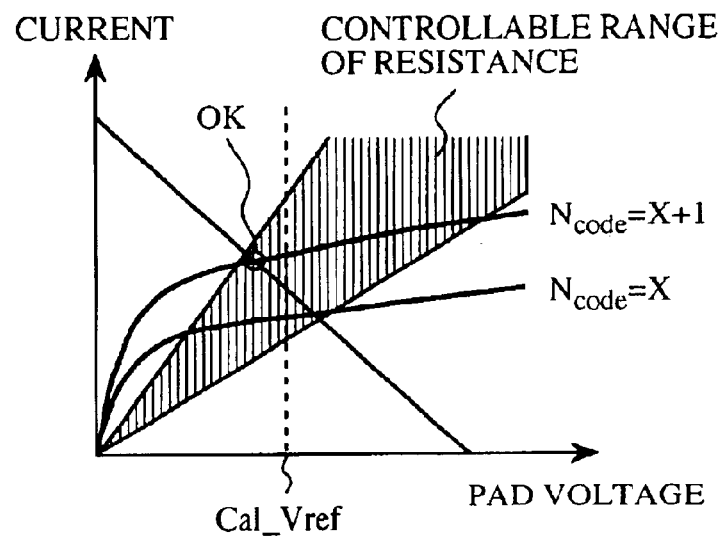
FIG. 16 is a diagram illustrating the operating principle of the conventional impedance control circuit.
Figure 17:
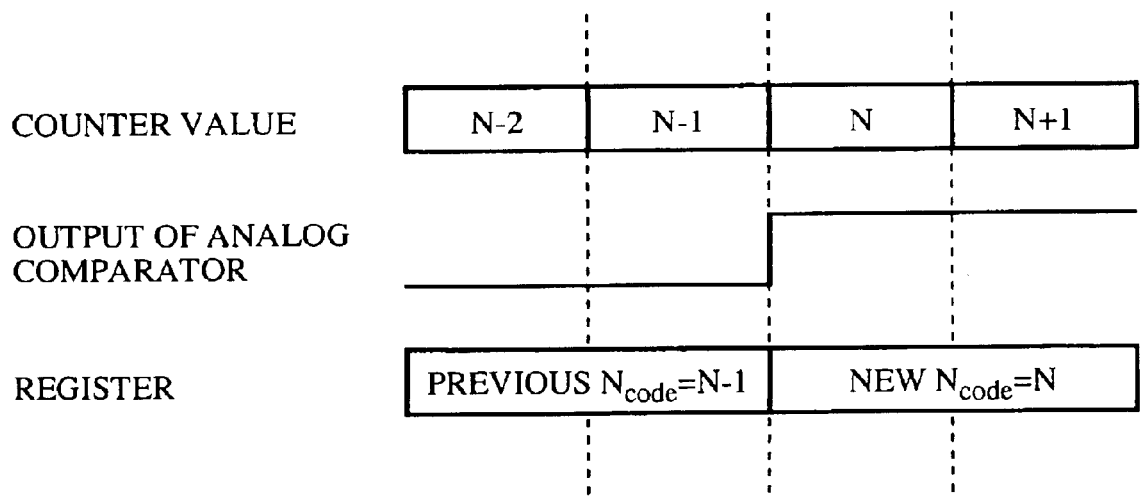
FIG. 17 is a diagram illustrating operating timings of the conventional impedance control circuit.

FIG. 1 is a block diagram showing a configuration of an embodiment 1 of the impedance control circuit in accordance with the present invention. In FIG. 1, the reference numeral 1 designates a single chip semiconductor integrated circuit (LSI), and 2 designates an impedance control circuit in accordance with the present invention. The reference numeral 4 designates a reference voltage selector, 8-1 designates a first register and 8-2 designates a second register. The reference numeral 9-1 designates a first output circuit and 9-2 designates a second output circuit. Reference numerals 11-1 and 11-2 each designate a PAD. The reference numeral 13-1 designates a first reference voltage (called "Cal_Vref1" from now on) and 13-2 designates a second reference voltage (called "Cal_Vref2" from now on). The reference numeral 30 designates a main circuit for carrying out main operation of the semiconductor integrated circuit 1. It includes a memory, a processor, logic circuits etc. In FIG. 1, the same reference numerals as those of FIG. 15 designate the same components as those of FIG. 15.

Next, the operation of the present embodiment 1 will be described.

The present embodiment 1 uses a plurality of different reference voltages Cal_Vref1 13-1 and Cal_Vref2 13-2 instead of the single reference resistor $R_{ref}$ 12.

The main circuit 30 receives signals from the outside of the chip, and supplies its output signals to the outside via the output circuits 9-1 and 9-2.

The output circuits 9-1 and 9-2 each vary its resistance in accordance with the value held by the register 8-1 or 8-2. For example, each of the output circuits 9-1 and 9-2 consists of a buffer circuit including a plurality of CMOS inverters connected in series. The resistance of the buffer circuit is varied by controlling the driving power of the buffer circuits. More specifically, the buffer circuit includes a plurality of NMOS transistors connected in parallel and its channel width is varied by controlling the number of the NMOS transistors to be brought into conduction by the value of the register.

The buffer circuit can also include PMOS transistors controlled by a circuit similar to the control circuit 3 as shown in FIG. 1. In this case, instead of the variable width NMOS transistor 6, a variable width PMOS transistor is connected to the PAD 10 which is supplied with the ground voltage via the resistor $R_{ref}$.

Returning to FIG. 1, the registers 8-1 and 8-2 each receive a reference voltage switching signal 4a. In response to the reference voltage switching signal 4a, the register that sets the output value of the counter 7 is selected.

The output of the comparator 5 is supplied to both the registers 8-1 and 8-2. The register selected by the reference voltage switching signal 4a holds the value of the counter 7 in response to the transition of the output level of the comparator 5.

Figure 2:
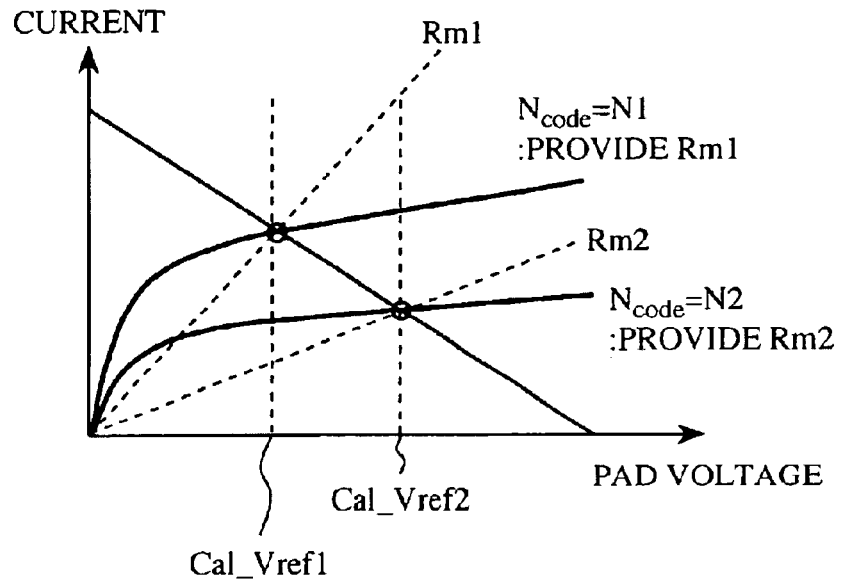
FIG. 2 is a graph illustrating the operating principle of the embodiment 1 in accordance with the present invention.

FIG. 2 is a graph illustrating the operating principle of the embodiment 1 in accordance with the present invention. As illustrated in FIG. 2, the numbers of MOS transistors in the variable width MOS 6 that give the resistances $R_{m1}$ and $R_{m2}$ corresponding to the Cal_Vref1 13-1 and Cal_Vref2 13-2 are obtained by switching the reference voltages. The resistances $R_{m1}$ and $R_{m2}$ are given by the following expressions (3) and (4).

$$R_{m1}=R_{ref} \times \text{Cal\_Vref1}/(V_{dd}-\text{Cal\_Vref1}) \quad (3)$$

$$R_{m2}=R_{ref} \times \text{Cal\_Vref2}/(V_{dd}-\text{Cal\_Vref2}) \quad (4)$$

Figure 3:
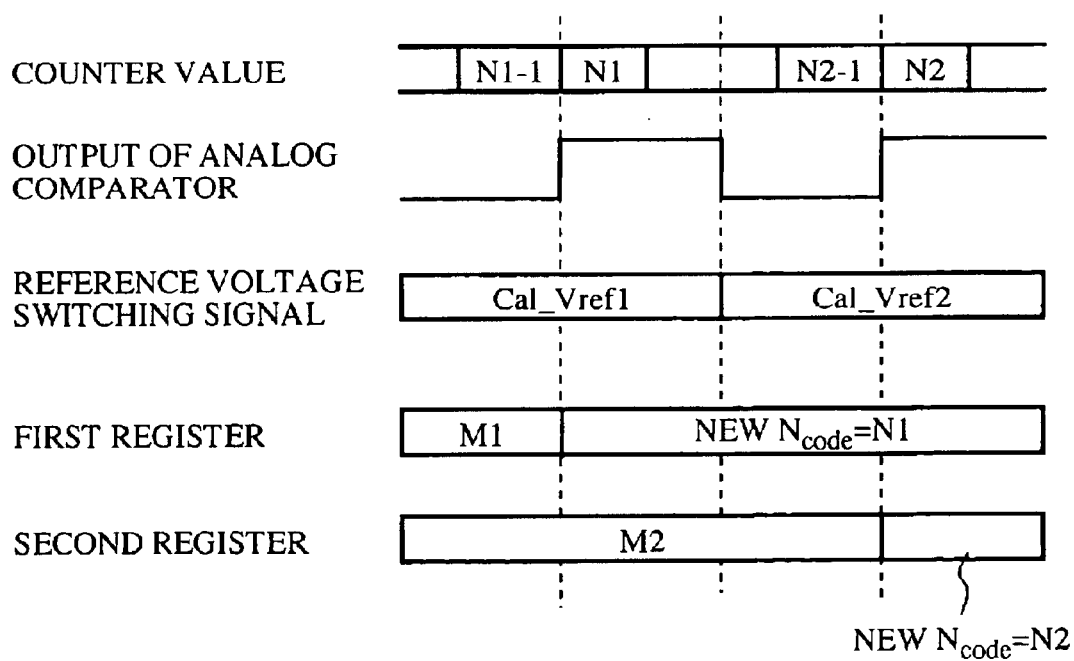
FIG. 3 is a diagram illustrating operating timings of the embodiment 1 of the impedance control circuit in accordance with the present invention.

FIG. 3 is a diagram illustrating operating timings of the embodiment 1 of the impedance control circuit in accordance with the present invention. While the reference voltage switching signal 4a selects the Cal_Vref1 13-1, it operates just as the conventional circuit, and the number $N_{code}$ controlled by the $R_{m1}$ is stored into the first register 8-1. Subsequently, the reference voltage switching signal 4a selects the Cal_Vref2 13-2, and the number $N_{code}$ controlled by the $R_{m2}$ is searched for in the same manner. The number $N_{code}$ searched for is stored into the second register 8-2.

The conventional impedance control circuit must include a couple of impedance control circuits to control two impedances. In contrast, the present embodiment 1 with the foregoing configuration can control the individual output circuits 9-1 and 9-2 according to the two resistance values $R_{m1}$ and $R_{m2}$ independently with the single reference resistor $R_{ref}$ 12 and impedance control circuit 2.

Although the impedance control circuit of FIG. 1 employs the NMOS logic circuit, it can also use a PMOS logic circuit with an analogous configuration. In addition, the output circuits (first and second output circuits 9-1 and 9-2) can be supplied with both the numbers $N_{code}$ N1 and N2 of FIG. 3 so that they can select one of them to carry out switching.

As described above, the present embodiment 1 of the impedance control circuit includes the reference voltage selector 4 for selecting one of the plurality of reference voltages 13-1 and 13-2; the variable width MOS 6; the comparator 5 that has the first input terminal supplied with the reference voltage from the reference voltage selector 4 and the second input terminal connected to the variable width MOS 6, and compares the voltages supplied to the first and second input terminals; and the control circuit 3 for establishing the plurality of impedances 9-1 and 9-2 corresponding to the plurality of reference voltages in response to the signal output from the comparator 5, wherein the number of the reference voltages 13-1 and 13-2 is two.

As described above, the present embodiment 1 offers an advantage of being able to adjust the resistances of the individual output circuits 9-1 and 9-2 independently according to the resistance values $R_{m1}$ and $R_{m2}$ of the variable width MOS 6, using only the single reference resistor $R_{ref}$ 12 and impedance control circuit 2.

Embodiment 2

Figure 4:
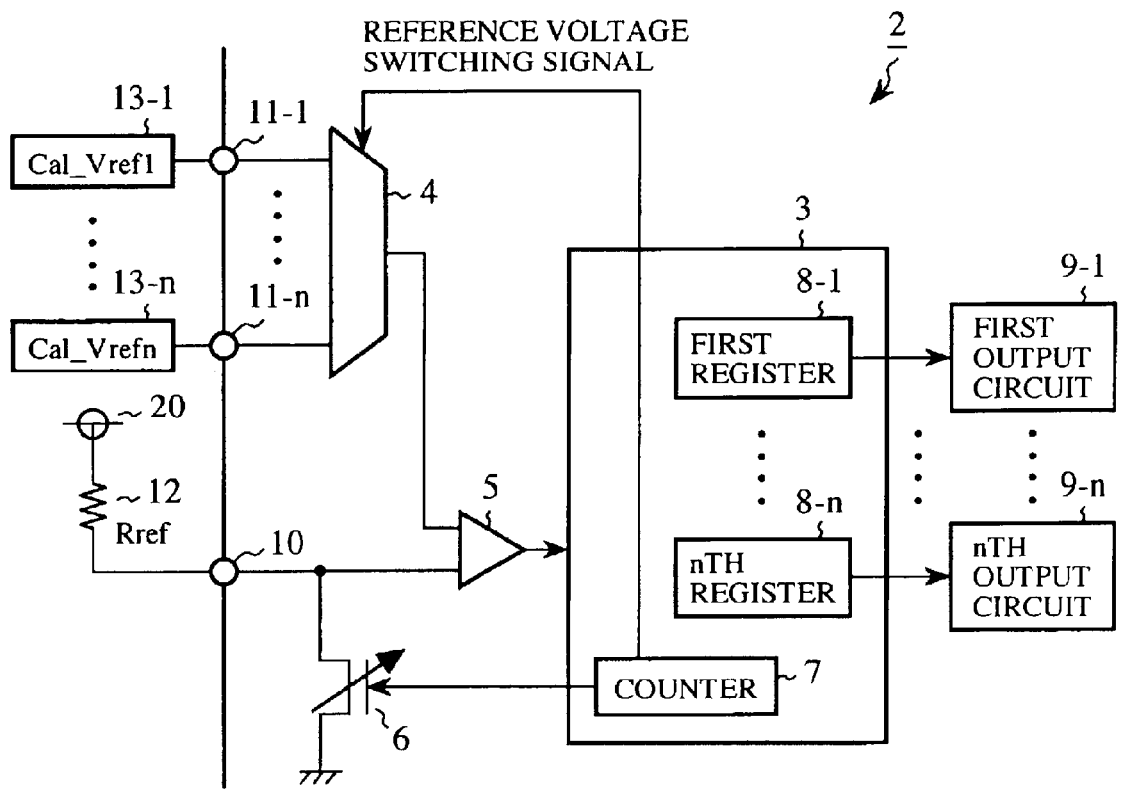
FIG. 4 is a block diagram showing a configuration of an embodiment 2 of the impedance control circuit in accordance with the present invention.

FIG. 4 is a block diagram showing a configuration of an embodiment 2 of the impedance control circuit in accordance with the present invention. In FIG. 4, the reference numeral 8-1 designates a first register, and 8-n designates an nth register, where n is an integer greater than two. The reference numeral 13-1 designates a first reference voltage Cal_Vref1, and 13-n designates an nth reference voltage Cal_Vrefn. To clarify the drawing, the second register to (n−1)th register, and the second reference voltage Cal_Vref2 to (n−1)th reference voltage Cal_Vref(n−1) are omitted in FIG. 4. As for the remaining components of FIG. 4, the same reference numerals designate the same or like components to those of FIG. 1.

Next, the operation of the present embodiment 2 will be described.

The present embodiment 2 controls n impedances using n reference voltages Cal_Vref1–Cal_Vrefn.

Figure 5:
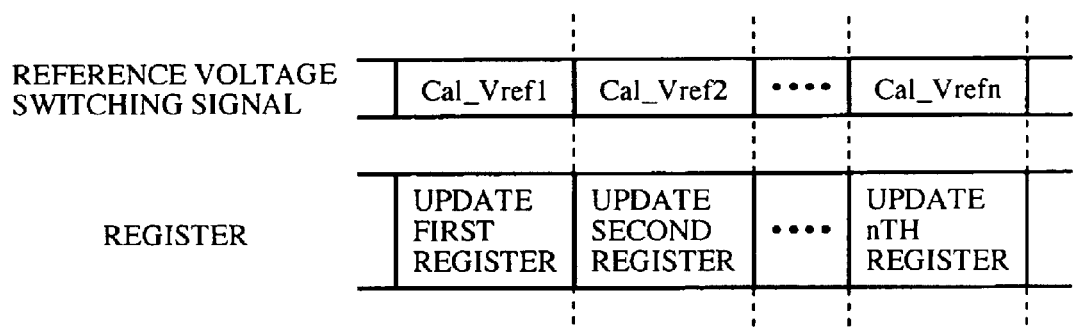
FIG. 5 is a diagram illustrating operating timings of the embodiment 2 of the impedance control circuit in accordance with the present invention.

FIG. 5 is a diagram illustrating operating timings of the embodiment 2 of the impedance control circuit. While the reference voltage switching signal 4a (FIG. 4) selects the reference voltage Cal_Vref1, the impedance control circuit 2 searches for the number $N_{code}$ for controlling the MOS resistance $R_{m1}$, and updates the first register 8-1. Likewise, while the reference voltage Cal_Vrefx is selected, the impedance control circuit 2 searches for the number $N_{code}$ for controlling the MOS resistance $R_{mx}$, and updates the xth register 8-x, where x is an integer varying from two to n. The operation is repeated until the reference voltage reaches the Cal_Vrefn.

Although the conventional impedance control circuit requires n different impedance control circuits to control n impedances, the present embodiment 2 can control n different impedances using the single reference resistor $R_{ref}$ 12 and the impedance single control circuit 2.

As described above, the present embodiment 2 of the impedance control circuit includes the reference voltage selector 4 for selecting one of the plurality of reference voltages 13-1–13-n; the variable width MOS 6; the comparator 5 that has a first input terminal supplied with the reference voltage from the reference voltage selector 4 and a second input terminal connected to the variable width MOS 6, and compares the voltages applied to the first and second input terminals; and the control circuit 3 for establishing the plurality of impedances 9-1–9-n corresponding to the plurality of reference voltages in response to the signal output from the comparator 5.

As described above, the present embodiment 2 offers an advantage of being able to control n different impedances with only one reference resistor $R_{ref}$ 12 and one impedance control circuit 2.

Embodiment 3

Figure 6:
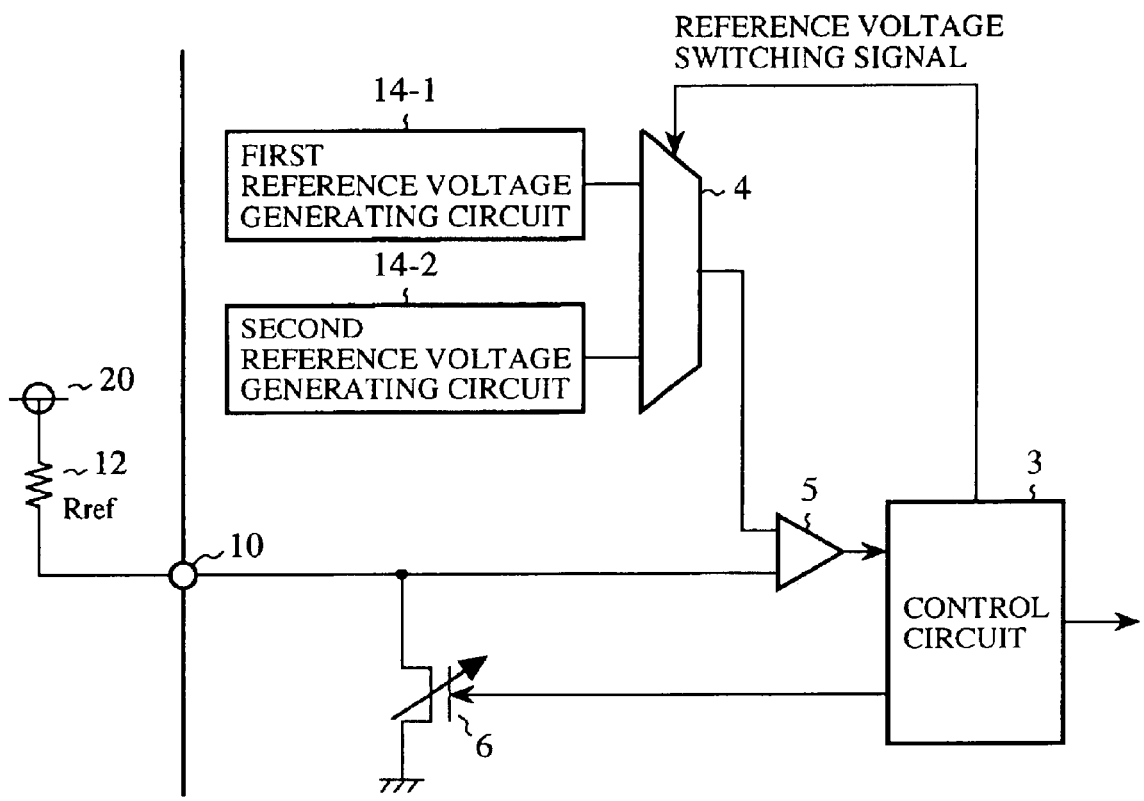
FIG. 6 is a block diagram showing a configuration of an embodiment 3 of the impedance control circuit in accordance with the present invention.

FIG. 6 is a block diagram showing a configuration of an embodiment 3 of the impedance control circuit in accordance with the present invention. In FIG. 6, the reference numeral 14-1 designates a first reference voltage generating circuit; and 14-2 designates a second reference voltage generating circuit. In FIG. 6, the same reference numerals as those of FIG. 1 designate the same or like components to those of FIG. 1.

Next, the operation of the present embodiment 3 will be described.

The present embodiment 3 includes the reference voltages which are externally supplied in the foregoing embodiment 1. As a result, the PAD 11-1 and PAD 11-2 for connecting the reference voltages can be eliminated. Accordingly, it can reduce the number of pins connected to the outside.

As described above, the present embodiment 3 of the impedance control circuit includes the reference voltage selector 4 for selecting one of the plurality of reference voltages 14-1–14-2; the variable width MOS 6; the comparator 5 that has a first input terminal supplied with the reference voltage from the reference voltage selector 4 and a second input terminal connected to the variable width MOS 6, and compares the voltages applied to the first and second input terminals; and the control circuit 3 for establishing the plurality of impedances 9-1–9-2 corresponding to the plurality of reference voltages in response to the signal output from the comparator 5.

As described above, the present embodiment 3 offers an advantage of being able to reduce the number of pins to be connected to the outside.

Embodiment 4

Figure 7:
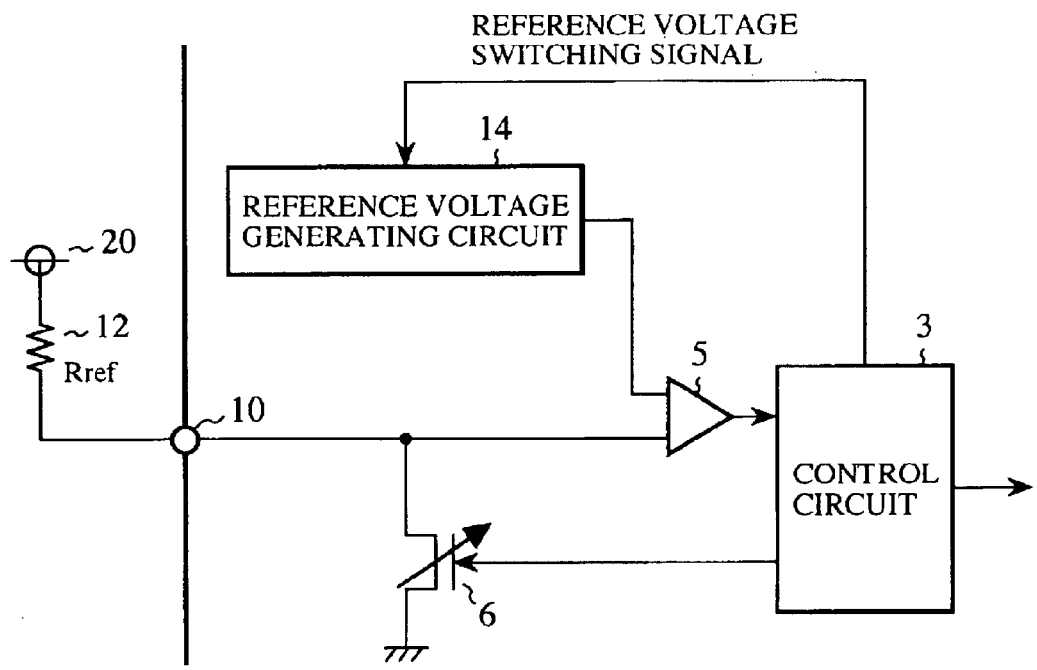
FIG. 7 is a block diagram showing a configuration of an embodiment 4 of the impedance control circuit in accordance with the present invention.

FIG. 7 is a block diagram showing a configuration of an embodiment 4 of the impedance control circuit in accordance with the present invention. In FIG. 7, the reference numeral 14 designates a reference voltage generating circuit for generating n different reference voltages. In FIG. 7, the same reference numerals to those of FIG. 4 designate the same or like portions to those of FIG. 4.

Next, the operation of the present embodiment 4 will be described.

The present embodiment 4 includes the reference voltages which are fed from the outside in the foregoing embodiment 2. In this case, the single reference voltage generating circuit 14 can generate the plurality of different reference voltages.

As described above, the present embodiment 4 of the impedance control circuit includes the reference voltage generating circuit 14 for generating the plurality of different reference voltages; the variable width MOS 6; the comparator 5 that has a first input terminal supplied with the reference voltage from the reference voltage generating circuit 14 and a second input terminal connected to the variable width MOS 6, and compares the voltages applied to the first and second input terminals; and the control circuit 3 for establishing the plurality of impedances 9-1–9-n corresponding to the plurality of reference voltages in response to the signal output from the comparator 5.

As described above, the present embodiment 4 offers an advantage of being able to generate the different reference voltages from the single generating circuit 14.

Embodiment 5

Figure 8:
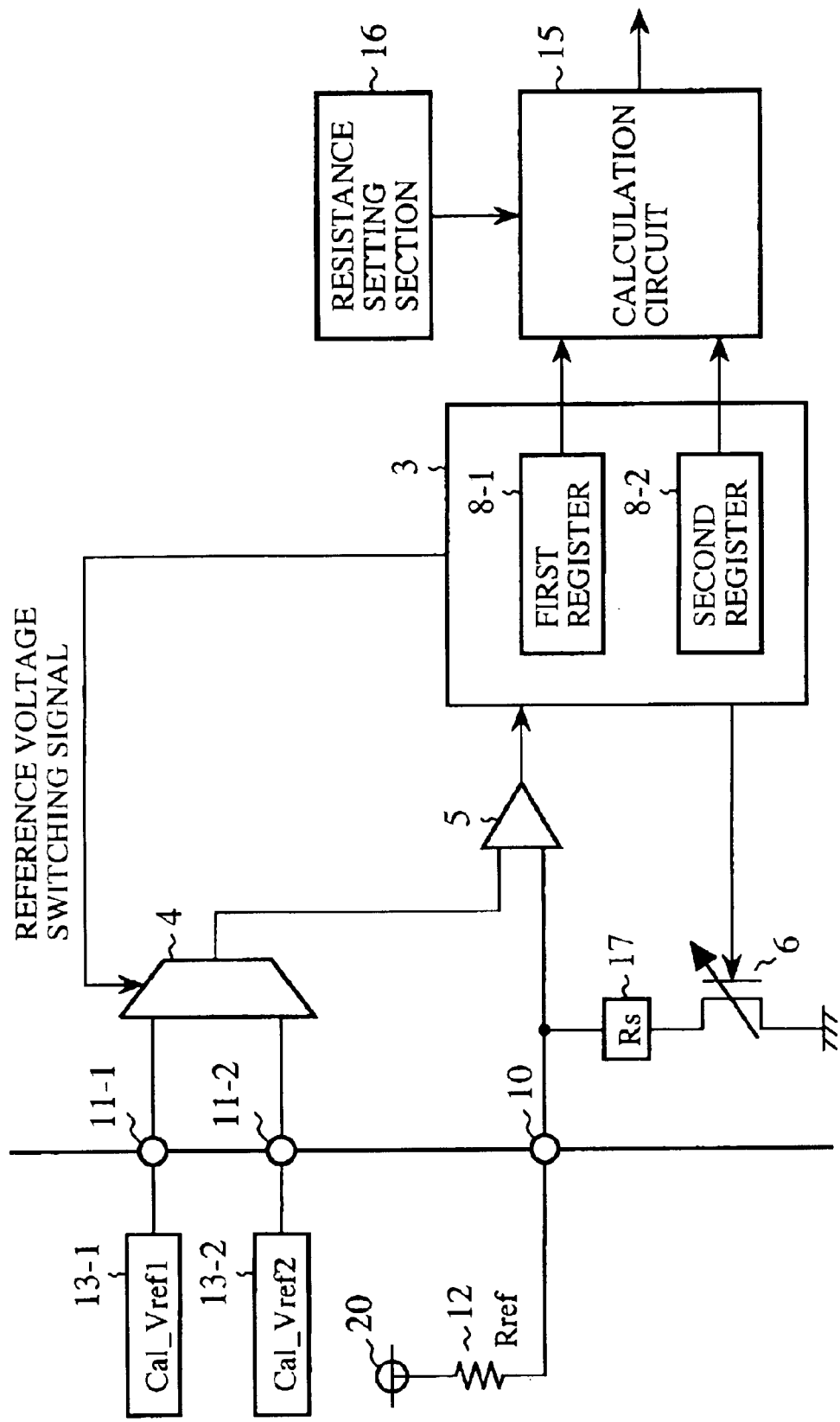
FIG. 8 is a block diagram showing a configuration of an embodiment 5 of the impedance control circuit in accordance with the present invention.

FIG. 8 is a block diagram showing a configuration of an embodiment 5 of the impedance control circuit in accordance with the present invention. In FIG. 8, the reference numeral 15 designates a calculation circuit, 16 designates a resistance setting section, and 17 designates a resistor (called "$R_s$" from now on) consisting of a parasitic resistance or a resistor connected in series. In FIG. 8, the output circuits connected to the output side of the calculation circuit 15 are omitted to simplify the drawing, and the same reference numerals as those of FIG. 1 designate the same or like components.

Next, the operation of the present embodiment 5 will be described.

The present embodiment 5 comprises the calculation circuit 15 and the resistance setting section 16 to distinguish the variations due to the parasitic resistance or series resistor $R_s$ 17 and the variations due to the variable width MOS 6, in addition to the circuit of the foregoing embodiment 1 that can calculate the resistor at two or more bias points.

Assume that the value of the parasitic resistance $R_s$ is $R_s$, the resistance value of the variable width MOS 6 is $R_{r1}$ for the number $N_{code1}$ and $R_{r2}$ for the number $N_{code2}$, and the actually realized resistance values are $R_{m1}$ and $R_{m2}$. The resistance values $R_{r1}$ and $R_{r2}$ are inversely proportional to the channel widths $W_1$ and $W_2$, and expressed as follows.

$$R_{r1}=\alpha/W_1=\alpha/(W_u \times N_{code1})=\beta/N_{code1} \quad (5)$$

$$R_{r2}=\alpha/W_2=\alpha/(W_u \times N_{code2})=\beta/N_{code2} \quad (6)$$

where $\alpha$ and $\beta$ are a coefficient of the inverse proportion, each.

Since the present embodiment 5 controls such that $R_s+R_{r1}$ equals $R_{m1}$, the following equations hold.

$$R_s+\beta/N_{code1}=R_{m1} \quad (7)$$

$$R_s+\beta/N_{code2}=R_{m2} \quad (8)$$

Solving the foregoing equations (7) and (8), the following solutions are obtained.

$$\beta=\alpha/W_u=(R_{m1}-R_{m2})\times N_{code1} \times N_{code2}/(N_{code2}-N_{code1}) \quad (9)$$

$$R_s=(N_{code2} \times R_{m2}-N_{code1} \times R_{m1})/(N_{code2}-N_{code1}) \quad (10)$$

Accordingly, the calculation circuit 15 of FIG. 8 can provide the values $R_s$ and $\beta$ at the measurement time by the calculation according to equations (9) and (10).

Once the values $R_s$ and $\beta$ are obtained, the number $N_x$ that defines the channel width of the variable width MOS 6 for providing a given resistance $R_x$ is given by the following expression (11).

$$N_x=\beta/(R_x-R_s) \quad (11)$$

Thus, the value $N_x$ is output as the final calculation result.

Figure 10:
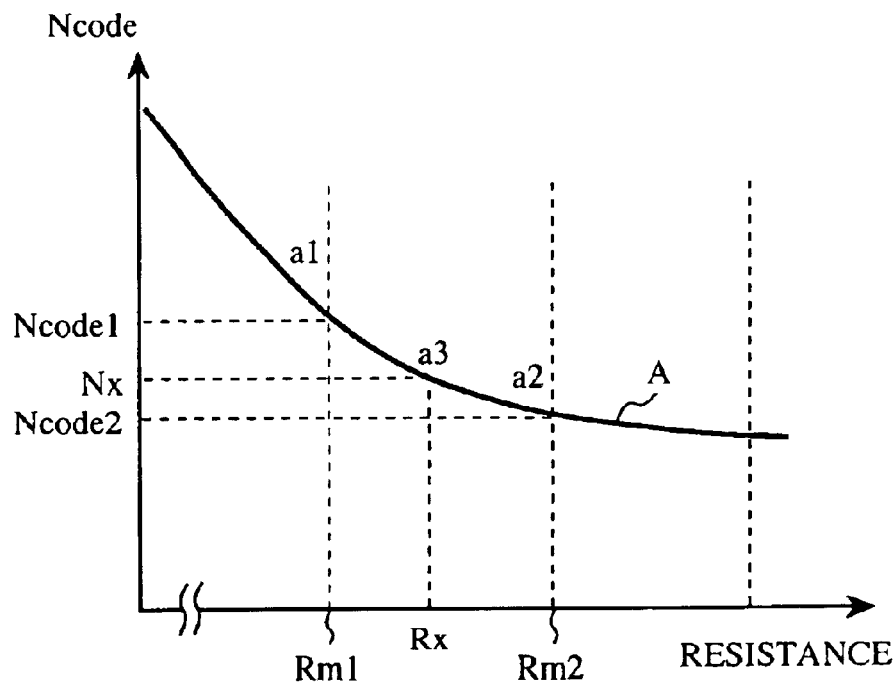
FIG. 10 is a graph illustrating characteristics of the embodiment 5 of the impedance control circuit in accordance with the present invention.

FIG. 10 is a graph illustrating the characteristics of the present embodiment 5 of the impedance control circuit. Rewriting the foregoing expressions (7) and (8) gives the following expressions.

$$N_{code1}=\beta/(R_{m1}-R_s) \quad (7')$$

$$N_{code2}=\beta/(R_{m2}-R_s) \quad (8')$$

Expressions (7') and (8') show that the number $N_{code}$ is inversely proportional to $(R_m-R_s)$ with the constant of inverse proportion $\beta$. Thus, the number $N_{code}$ is represented by the curve A of FIG. 10. In FIG. 10, the point a1 corresponds to expression (7'), and the point a2 to expression (8'). To obtain $R_s$ and $\beta$ is equivalent to obtain the curve A of FIG. 10. Once the curve A is obtained, the value $N_x$ to realize the resistor $R_x$ corresponding to the point a3 can be calculated, which corresponds to equation (11).

Figure 9:
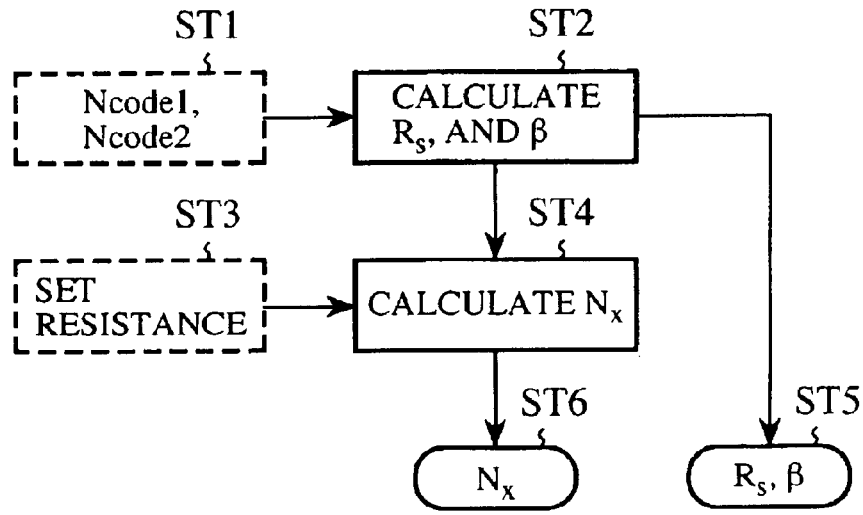
FIG. 9 is a flowchart illustrating the operation of the embodiment 5 of the impedance control circuit in accordance with the present invention.

FIG. 9 is a flowchart illustrating the operation of the embodiment 5 of the impedance control circuit in accordance with the present invention.

At step ST1, the numbers $N_{code1}$ and $N_{code2}$ fed from the first register 8-1 and second register 8-2 are supplied to the calculation circuit 15. At step ST2, the calculation circuit 15 carries out the calculation for obtaining the values $R_s$ and $\beta$ according to expressions (9) and (10).

At step ST3, the resistance setting section 16 supplies the setting value $R_x$ to the calculation circuit 15. At step ST4, the calculation circuit 15 carries out the calculation for obtaining the value $N_x$ according to expression (11).

At step ST5, the calculation circuit 15 outputs the values $R_s$ and $\beta$. At step ST6, the calculation circuit 15 outputs the value $N_x$.

The foregoing embodiment 1 can control only the values of particular resistances. In contrast, the present embodiment 5 can adjust the resistance values to the given values using the additional calculation circuit 15. In addition, it can recognize the characteristic of the variable width MOS 6 and that of the series resistance $R_s$ 17 in terms of the values $R_s$ and $\beta$.

The resistance setting section 16 can be integrated into the circuit, or can be installed outside the semiconductor integrated circuit (LSI) 1.

As described above, the present embodiment 5 of the impedance control circuit includes the reference voltage selector 4 for selecting one of the plurality of reference voltages 13-1–13-2; the variable width MOS 6; the comparator 5 that has a first input terminal supplied with the reference voltage from the reference voltage selector 4 and a second input terminal connected to the variable width MOS 6, and compares the voltages applied to the first and second input terminals; the control circuit 3 for establishing the plurality of impedances 9-1 and 9-2 corresponding to the plurality of reference voltages in response to the signal output from the comparator 5; and the calculation circuit 15 for setting an impedance with a given value for implementing the plurality of different impedances, wherein the calculation circuit 15 carries out the calculation for distinguishing the series resistance 17 and the variable width MOS 6, and the number of reference voltages is two (13-1 and 13-2).

As described above, the present embodiment 5 offers an advantage of being able to realize the resistance with a given value.

In addition, the present embodiment 5 offers an advantage of being able to recognize the characteristics of the variable width MOS 6 and serial resistance $R_s$ 17.

Embodiment 6

Figure 11:
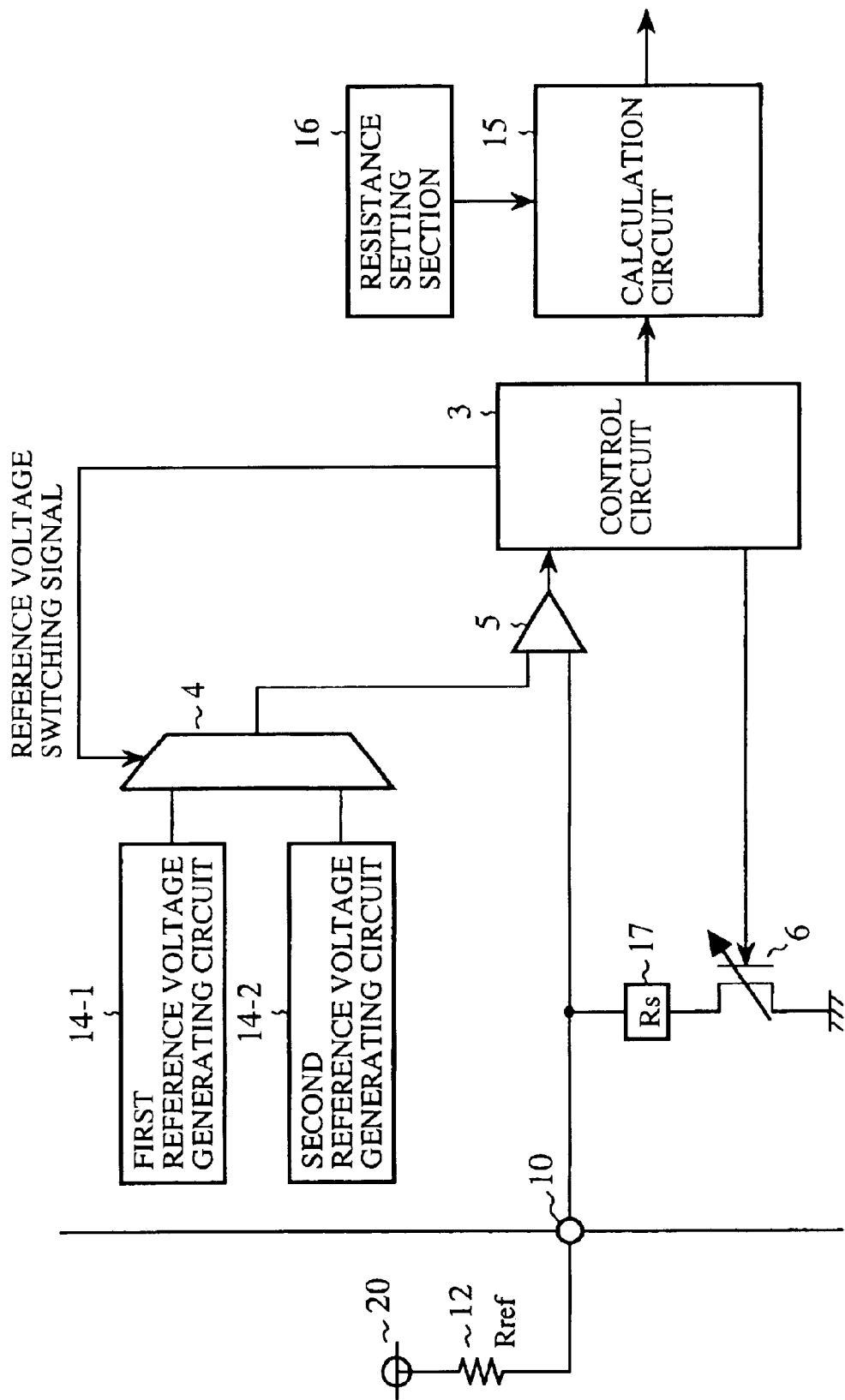
FIG. 11 is a block diagram showing a configuration of an embodiment 6 of the impedance control circuit in accordance with the present invention.

FIG. 11 is a block diagram showing a configuration of an embodiment 6 of the impedance control circuit in accordance with the present invention. In FIG. 11, the reference numeral 14-1 designates a first reference voltage generating circuit, and 14-2 designates a second reference voltage generating circuit. As for the remaining components, the same reference numerals as those of FIG. 8 designate the same or like components to those of FIG. 8.

Next, the operation of the present embodiment 6 will be described.

In the present embodiment 6, the reference voltages are integrated into the configuration of the foregoing embodiment 5 in the same manner as in the foregoing embodiment 3. Thus, it can reduce the number of pins.

As described above, the present embodiment 6 of the impedance control circuit includes the reference voltage selector 4 for selecting one of the plurality of reference voltages 14-1–14-2; the variable width MOS 6; the comparator 5 that has a first input terminal supplied with the reference voltage from the reference voltage selector 4 and a second input terminal connected to the variable width MOS 6, and compares the voltages applied to the first and second input terminals; the control circuit 3 for establishing the plurality of impedances 9-1 and 9-2 corresponding to the plurality of reference voltages in response to the signal output from the comparator 5; and the calculation circuit 15 for setting an impedance with a given value for implementing the plurality of different impedances, wherein the calculation circuit 15 carries out the calculation for distinguishing the series resistance 17 and the variable width MOS 6, and the two reference voltages 14-1 and 14-2 are integrated into the impedance control circuit.

As described above, the present embodiment 6 offers an advantage of being able to reduce the number of pins.

Embodiment 7

Figure 12:
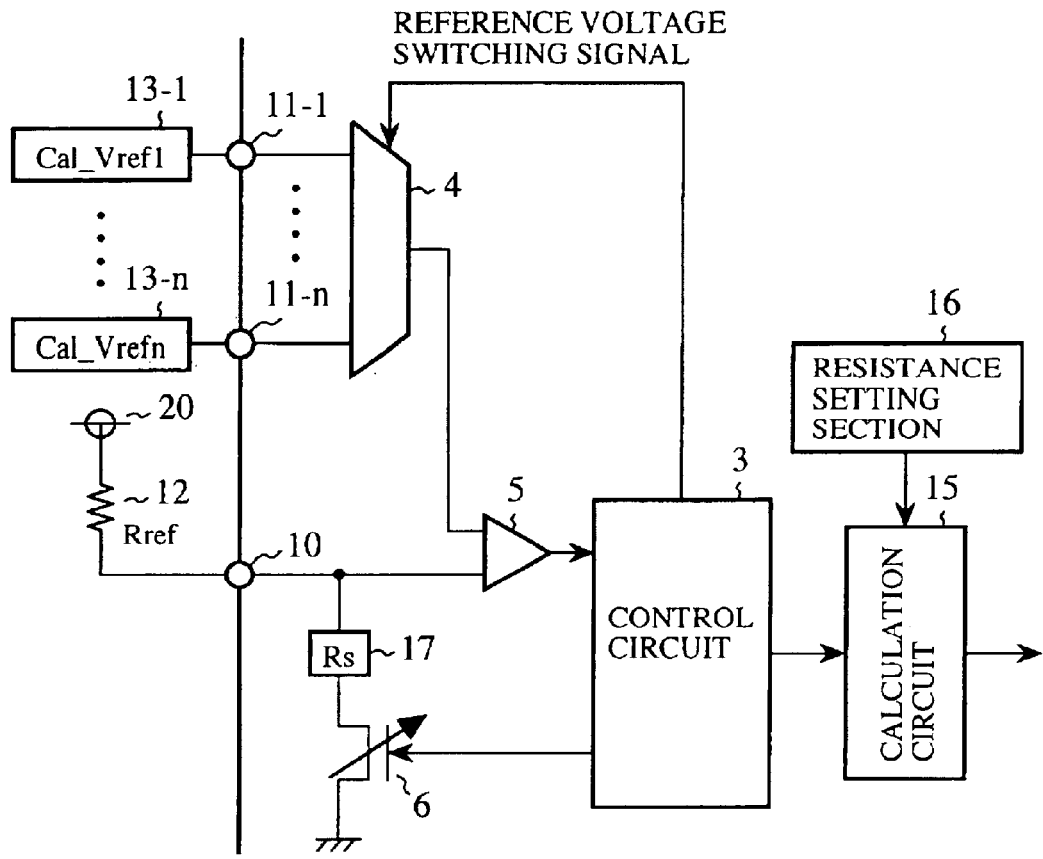
FIG. 12 is a block diagram showing a configuration of an embodiment 7 of the impedance control circuit in accordance with the present invention.

FIG. 12 is a block diagram showing a configuration of an embodiment 7 of the impedance control circuit in accordance with the present invention. In FIG. 12, the reference numeral 15 designates a calculation circuit, 16 designates a resistance setting section, and 17 designates a resistor (called "$R_s$" from now on) consisting of a parasitic resistance or a resistor connected in series with the variable width MOS 6. In FIG. 12, the output circuits connected to the output side of the calculation circuit 15 are omitted to simplify the drawing, and the same reference numerals as those of FIG. 4 designate the same or like components to those of FIG. 4. In FIG. 12, the control circuit 3 has the same internal configuration as the control circuit 3 of FIG. 4.

Next, the operation of the present embodiment 7 will be described.

Although the foregoing embodiment 5 considers that the coefficient of inverse proportion α is fixed for the different voltages, it can actually vary slightly, causing an error. In other words, the constant of inverse proportion β of the curve A of FIG. 10 varies with respect to the voltage. As a result, in regions far apart from the range of the resistance controlled by the foregoing embodiment 1, that is, in the regions departing greatly from the voltage range corresponding to the resistance, the constant of inverse proportion β of the curve A of FIG. 10 deviates, increasing the error of the actual impedance.

In view of this, the present embodiment 7 prepares n reference voltages as in the foregoing embodiment 2, and obtains the constant of inverse proportion β of the curve A for individual sections between the successive reference voltages in the same manner as the foregoing embodiment 5. Thus, it can control the impedance accurately.

Figure 13:
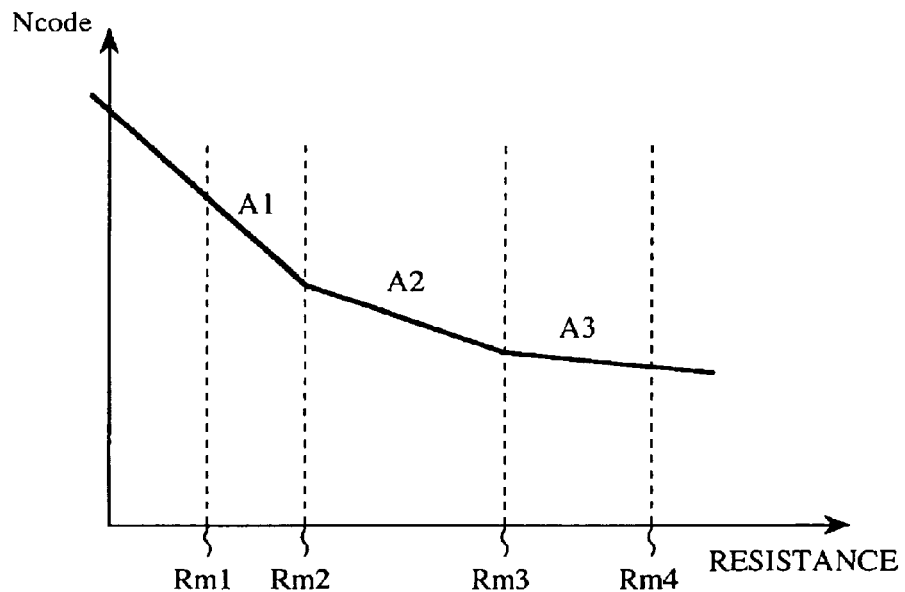
FIG. 13 is a graph illustrating characteristics of the embodiment 7 of the impedance control circuit in accordance with the present invention.

FIG. 13 is a graph illustrating the characteristics of the embodiment 7 of the impedance control circuit in accordance with the present invention. As described above, the constant of inverse proportion β of the curve A varies with respect to the voltage. Considering this, FIG. 13 illustrates a case that uses four reference voltages corresponding to the resistances $R_{m1}$ to $R_{m4}$ of the variable width MOS 6, and obtains the constant of inverse proportion β of the curve A for the individual sections of the reference voltages. Thus, the constants of inverse proportion β1 to β3 are obtained for the lines A1 to A3.

Assume that the reference voltages reduce in the order of Cal_Vref1 13-1, Cal_Vref2 13-2, . . . , Cal_Vrefn 13-n, and that the resistance values corresponding to them are $R_{m1}$, $R_{m2}$, . . . , $R_{mn}$. As for the resistance R<$R_{m2}$, the values β and $R_s$ are calculated from the values $R_{m1}$ and $R_{m2}$ using equations (9) and (10), and used for the control. As for the resistance R>$R_{mn}$, the values β and $R_s$ are calculated from the values $R_{mn}$ and $R_{mn-1}$ using equations (9) and (10), and used for the control. In the other sections where $R_{mi}$<R<$R_{mi-1}$, the values β and $R_s$ are calculated from the values $R_{mi}$ and $R_{mi-1}$ using equations (9) and (10), and used for the control.

As described above, the present embodiment 7 can improve the accuracy of the impedance by calculating the values β and $R_s$ for the individual sections between the plurality of reference voltages and by using them for the control.

As described above, the present embodiment 7 of the impedance control circuit includes the reference voltage selector 4 for selecting one of the plurality of reference voltages 13-1–13-n; the variable width MOS 6; the comparator 5 that has a first input terminal supplied with the reference voltage from the reference voltage selector 4 and a second input terminal connected to the variable width MOS 6, and compares the voltages applied to the first and second input terminals; the control circuit 3 for establishing the plurality of impedances 9-1 and 9-n corresponding to the plurality of reference voltages in response to the signal output from the comparator 5; and the calculation circuit 15 for setting an impedance with a given value for implementing the plurality of different impedances 9-1 and 9-n, wherein the calculation circuit 15 carries out the calculation for distinguishing the series resistance 17 and the variable width MOS 6.

As described above, the present embodiment 7 offers an advantage of being able to improve the accuracy of the impedances realized.

Embodiment 8

Figure 14:
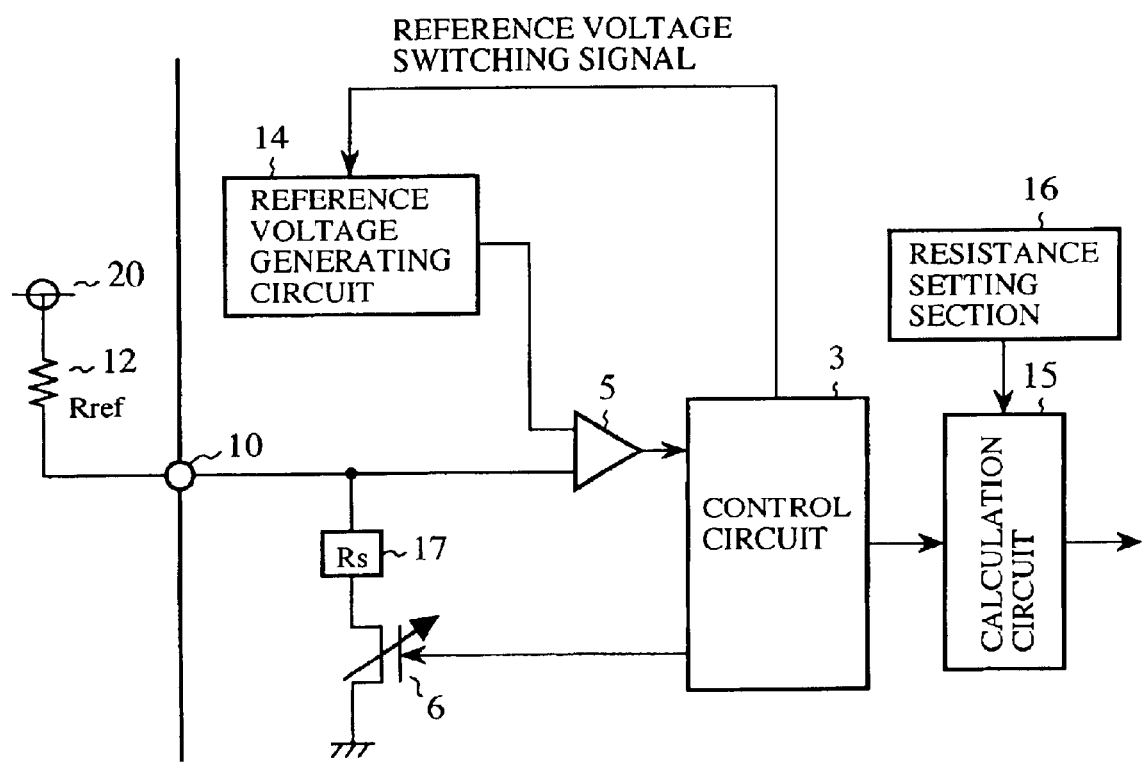
FIG. 14 is a block diagram showing a configuration of an embodiment 8 of the impedance control circuit in accordance with the present invention.

FIG. 14 is a block diagram showing a configuration of an embodiment 8 of the impedance control circuit in accordance with the present invention. In FIG. 14, the reference numeral 15 designates a calculation circuit, 16 designates a resistance setting section, and 17 designates a resistor (called "$R_s$" from now on) consisting of a parasitic resistance or a resistor connected in series with the variable width MOS 6. In FIG. 14, the output circuits connected to the output side of the calculation circuit 15 are omitted to simplify the drawing, and the same reference numerals as those of FIG. 7 designate the same or like components to those of FIG. 7. In FIG. 14, the control circuit 3 has the same internal configuration as the control circuit 3 of FIG. 7.

Next, the operation of the present embodiment 8 will be described.

The present embodiment 8 integrates the reference voltage generating circuit 14 into the configuration of the foregoing embodiment 7 of FIG. 12 in the same manner as the foregoing embodiment 4 of FIG. 7. Thus, it can reduce the number of pins.

As described above, the present embodiment 8 of the impedance control circuit includes the reference voltage generating circuit 14 for generating the plurality of reference voltages; the variable width MOS 6; the comparator 5 that has a first input terminal supplied with the reference voltage from the reference voltage generating circuit 14 and a second input terminal connected to the variable width MOS 6, and compares the voltages applied to the first and second input terminals; the control circuit 3 for establishing the plurality of impedances 9-1 and 9-n corresponding to the plurality of reference voltages in response to the signal output from the comparator 5; and the calculation circuit 15 for setting an impedance with a given value for implementing the plurality of different impedances 9-1 and 9-n, wherein the calculation circuit 15 carries out the calculation for distinguishing the series resistance 17 and the variable width MOS 6.

As described above, the present embodiment 8 offers an advantage of being able to reduce the number of pins.

What is claimed is:

1. An impedance control circuit comprising:

a reference voltage output circuit for outputting one of a plurality of reference voltages;

a variable resistor;

a comparator that has a first input terminal supplied with a reference voltage from said reference voltage output circuit and a second input terminal connected to said variable resistor, wherein the comparator compares the voltages supplied to the first and second input terminals;

a control circuit for controlling said variable resistor and for establishing a plurality of impedances corresponding to the plurality of reference voltages in response to a signal output from said comparator; and a calculation circuit for establishing an impedance with a desired value using a plurality of resistances of said variable resistor corresponding to the plurality of reference voltages.

2. The impedance control circuit according to claim 1, wherein said calculation circuit carries out calculation of a resistance of said variable resistor itself and a resistance interposed in series with said variable resistor separately.

3. The impedance control circuit according to claim 1, wherein said impedance control circuit includes the plurality of reference voltages.

4. The impedance control circuit according to claim 1, wherein the number of the reference voltages is two.

5. The impedance control circuit according to claim 1, wherein said impedance control circuit includes the plurality of reference voltages.

6. The impedance control circuit according to claim 1, wherein the number of the reference voltages is two.

7. The impedance control circuit according to claim 1, wherein said reference voltage output circuit comprises a reference voltage selector for selecting one of the plurality of reference voltages and for outputting the selected reference voltage.

8. The impedance control circuit according to claim 1, wherein said reference voltage output circuit comprises a reference voltage generating circuit for selectively generating one of the plurality of reference voltages.

* * * * *

UNITED STATES PATENT AND TRADEMARK OFFICE
CERTIFICATE OF CORRECTION

PATENT NO.     : 6,815,979 B2
DATED          : November 9, 2004
INVENTOR(S)    : Takeshi Ooshita It is certified that error appears in the above-identified patent and that said Letters Patent is hereby corrected as shown below:

Column 12,
Line 20 and 23, change "claim 1" to -- claim 2 --.

Signed and Sealed this

Thirteenth Day of September, 2005

JON W. DUDAS
*Director of the United States Patent and Trademark Office*